United States Patent
Wang et al.

(10) Patent No.: US 11,030,265 B2
(45) Date of Patent: Jun. 8, 2021

(54) CROSS-PLATFORM DATA MATCHING METHOD AND APPARATUS, COMPUTER DEVICE AND STORAGE MEDIUM

(71) Applicant: PING AN TECHNOLOGY (SHENZHEN) CO., LTD., Shenzhen (CN)

(72) Inventors: Jianzong Wang, Shenzhen (CN); Zhangcheng Huang, Shenzhen (CN); Tianbo Wu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 213 days.

(21) Appl. No.: 16/348,966

(22) PCT Filed: Sep. 29, 2017

(86) PCT No.: PCT/CN2017/104666
§ 371 (c)(1),
(2) Date: May 10, 2019

(87) PCT Pub. No.: WO2019/019385
PCT Pub. Date: Jan. 31, 2019

(65) Prior Publication Data
US 2019/0278822 A1 Sep. 12, 2019

(30) Foreign Application Priority Data
Jul. 26, 2017 (CN) .......................... 201710618378.1

(51) Int. Cl.
*G06F 16/9536* (2019.01)
*G06F 16/9535* (2019.01)
(Continued)

(52) U.S. Cl.
CPC ...... *G06F 16/9536* (2019.01); *G06F 16/2228* (2019.01); *G06F 16/24* (2019.01);
(Continued)

(58) Field of Classification Search
None
See application file for complete search history.

(56) References Cited

U.S. PATENT DOCUMENTS 8,655,792 B1* 2/2014 Gauvin .............. G06F 16/9535
705/319
8,706,739 B1* 4/2014 Song ................... G06F 16/9535
707/748
(Continued)

FOREIGN PATENT DOCUMENTS

CN 101510856 A 8/2009
CN 102664967 A 9/2012
(Continued)

OTHER PUBLICATIONS

Liu et al. "HYDRA: large-scale social identity linkage via heterogeneous behavior modeling". SIGMOD '14: Proceedings of the 2014 ACM SIGMOD International Conference on Management of Data, p. 51-62; Jun. 2014. URL Link: <https://dl.acm.org/doi/10.1145/2588555.2588559>. Accessed Jan. 2021. (Year: 2014).*
(Continued)

*Primary Examiner* — Irene Baker
(74) *Attorney, Agent, or Firm* — Rimon PC

(57) ABSTRACT

A method of matching cross-platform data, comprising: receiving a data matching request sent by a terminal; obtaining a group behavior data corresponding to the first user group in the first social network platform, and learning the group behavior data to obtain a group feature distribution function; obtaining associated users of the designated root node users and corresponding behavior data in the second
(Continued)

social network platform; learning the behavior data of the root node users, and generating the group feature distribution function after matching the root node users; performing the behavior learning to the behavior data of the associated users; calculating a maximum entropy value of the group feature distribution function after matching the associated users, and determining the associated users corresponding to the largest maximum entropy value as the matching users of the first user group; and regarding the determined matching users as current root node users, determining a next matching user until the determined matching users meet a set quantity condition, and completing a group matching.

15 Claims, 5 Drawing Sheets

(51) Int. Cl.
*G06F 16/951* (2019.01)
*G06Q 50/00* (2012.01)
*G06F 16/22* (2019.01)
*G06F 16/24* (2019.01)

(52) U.S. Cl.
CPC ........ *G06F 16/951* (2019.01); *G06F 16/9535* (2019.01); *G06Q 50/01* (2013.01)

(56) References Cited

U.S. PATENT DOCUMENTS

| | | | | |
|---|---|---|---|---|
| 9,098,819 | B1* | 8/2015 | Korula | G06Q 50/01 |
| 2010/0274815 | A1* | 10/2010 | Vanasco | G06Q 10/107 |
| | | | | 707/798 |
| 2012/0324550 | A1* | 12/2012 | Wasilewski | H04N 21/252 |
| | | | | 726/5 |
| 2013/0110641 | A1* | 5/2013 | Ormont | G06Q 50/01 |
| | | | | 705/14.66 |
| 2014/0164398 | A1* | 6/2014 | Smith | G06F 16/24578 |
| | | | | 707/748 |
| 2014/0280592 | A1* | 9/2014 | Zafarani | H04L 67/22 |
| | | | | 709/204 |
| 2015/0356444 | A1* | 12/2015 | Zhao | H04L 51/32 |
| | | | | 706/55 |
| 2016/0072824 | A1* | 3/2016 | Johansson | H04L 63/10 |
| | | | | 726/7 |
| 2016/0147758 | A1 | 5/2016 | Chhaya et al. | |
| 2018/0068028 | A1* | 3/2018 | Thirugnanasundaram | |
| | | | | G06Q 50/01 |

FOREIGN PATENT DOCUMENTS

| | | |
|---|---|---|
| CN | 102710636 A | 10/2012 |
| CN | 103793460 A | 5/2014 |
| CN | 104090971 A | 10/2014 |
| CN | 104317959 A | 1/2015 |
| CN | 104573057 A | 4/2015 |
| CN | 104765729 A | 7/2015 |
| CN | 106777382 A | 5/2017 |
| WO | 2016029794 A1 | 3/2016 |

OTHER PUBLICATIONS

Zhou et al. "Cross-Platform Identification of Anonymous Identical Users in Multiple Social Media Networks". IEEE Transaction on knowledge and data engineering, vol. 28, No. 2, pp. 411-424; Feb. 2016. URL Link: <https://ieeexplore.ieee.org/document/7286833>. Accessed Jan. 2021. (Year: 2016).*

Vosecky et al. "User identification across multiple social networks". First IEEE International Conference on Networked Digital Technologies NTD'09, pp. 360-365; Jul. 2009. URL Link: <https://ieeexplore.ieee.org/document/5272173>. Accessed Jan. 2021. (Year: 2009).*

Tan et al. "Mapping Users across Networks by Manifold Alignment on Hypergraph". Association for the Advancement of Artificial Intelligence, vo. 14, pp. 159-165; Jun. 19, 2014. URL Link: <https://ojs.aaai.org/index.php/AAAI/article/view/8720>. Accessed Jan. 2021. (Year: 2014).*

Shu et al. "User Identity Linkage across Online Social Networks". ACM SIGKDD Explorations Newsletter, vol. 18, issue 2, pp. 5-17; Mar. 2017. URL Link: <https://doi.org/10.1145/3068777.3068781>. Accessed Jan. 2021. (Year: 2017).*

Zafarani et al. "Connecting Users across Social Media Sites: A Behavioral-Modeling Approach". KDD '13: Proceedings of the 19th ACM SIGKDD International Conference on Knowledge discovery and data mining, pp. 41-49; Aug. 2013. URL Link: <https://dl.acm.org/doi/10.1145/2487575.2487648>. Accessed Jan. 2021. (Year: 2013).*

Korula et al. "An efficient reconciliation algorithm for social networks". Proceedings of the VLDB Endowment; Jan. 2014. URL Link: <https://dl.acm.org/doi/10.14778/2732269.2732274 >. Accessed Jan. 2021. (Year: 2014).*

Liang et al. "GCM: A Greedy-Based Cross-Matching Algorithm for Identifying Users Across Multiple Online Social Networks". PAISI 2015, pp. 51-70; May 2015. URL Link: <https://link.springer.com/chapter/10.1007%2F978-3-319-18455-5_4>. Accessed Jan. 2021. (Year: 2015).*

International Search Report for Application No. PCT/CN2017/104666 dated Apr. 20, 2018.

* cited by examiner

CROSS-PLATFORM DATA MATCHING METHOD AND APPARATUS, COMPUTER DEVICE AND STORAGE MEDIUM

This application claims priority to Chinese Patent Application No. 2017106183781, entitled "cross-platform data matching method and apparatus, computer device, and storage medium" filed on Jul. 26, 2017, the contents of which is expressly incorporated herein by reference in its entirety.

TECHNICAL FIELD

The present disclosure relates to the technical field of computer, and more particularly, to a cross-platform data matching method, apparatus, computer apparatus, and storage medium.

BACKGROUND

Social networks have become "sensors" that sense online-behaviors of individuals. A large number of social "sensors" can sense different levels of information of users, including name, age, gender, consumption ability, dating habits, payment habits, shopping preferences, and attitudes about certain opinions, goods, and services, etc.

In financial big data applications, same real users access in different social networks, and contents published by the same users on different social network platforms may be different (themes are different, for example, information between a gourmet social network and an image social network are difficult to match; scales of published contents are different, for example, densities of contents between a new platform and a platform used for a long time are different), thus, it is difficult to perform a user identity matching with these different contents, which leads to an obstacle of cross-platform data fusion ultimately. Therefore, a big data analysis is merely limited to a single social network platform with a poor analysis effect, and the big data cannot be utilized fully.

SUMMARY

Accordingly, it is necessary to provide a cross-platform data matching method, device, computer apparatus and storage medium.

A method of matching cross-platform data, comprising:
receiving a data matching request sent by a terminal, wherein the data matching request carries a identifier of a first social network platform, a first user group in the first social network platform designated by users, and a identifier of a second social network platform and root node users in a second social network platform designated by the users;
obtaining a group behavior data corresponding to the first user group in the first social network platform corresponding to the identifier of the first social network platform, and performing behavior learning to the group behavior data to obtain a group feature distribution function corresponding to the first user group;
obtaining associated users of the root node users in the second social network platform, and obtaining the behavior data corresponding to the root node users and each of the associated users in the second social network platform;
learning the behavior data of the root node users based on the group feature distribution function corresponding to the first user group, and generating the group feature distribution function after matching the root node users;
performing the behavior learning to the behavior data of each associated user based on the group feature distribution function after matching the root node users, and generating the group feature distribution function after matching each of the associated users;
calculating a maximum entropy value of the group feature distribution function after matching the associated users, and determining the associated users corresponding to the largest maximum entropy value as the matching users of the first user group; and
regarding the determined matching users as current root node users, determining a next matching user until the determined matching users meet a set quantity condition, and completing a group matching.

A cross-platform data matching device, comprising:
a matching request module configured to receive a data matching request sent by a terminal, wherein the data matching request carries a identifier of a first social network platform, a first user group in the first social network platform designated by users, and a identifier of a second social network platform and root node users in a second social network platform designated by the users;
a group feature learning module configured to obtain a group behavior data corresponding to the first user group in the first social network platform corresponding to the identifier of the first social network platform, and performing behavior learning to the group behavior data to obtain a group feature distribution function corresponding to the first user group;
a to-be-matched node determining module configured to obtain associated users of the root node users in the second social network platform, and to obtain the behavior data corresponding to the root node users and each of the associated users in the second social network platform;
a root node feature learning module configured to learn the behavior data of the root node users based on the group feature distribution function corresponding to the first user group and generate the group feature distribution function after matching the root node users;
an associated node feature learning module configured to perform the behavior learning to the behavior data of each associated user based on the group feature distribution function after matching the root node users and generate the group feature distribution function after matching each of the associated users; and
a matching module configured to calculate a maximum entropy value of the group feature distribution function after matching the associated users, and determining the associated users corresponding to the largest maximum entropy value as the matching users of the first user group, and to use the determined matching users as current root node users for determining a next matching user, until the determined matching users meet a set quantity condition, and to complete a group matching.

A computer apparatus, comprising a processor and a memory storing computer readable instructions, which, when executed by the processor, causes the processor to perform steps comprising:
receiving a data matching request sent by a terminal, wherein the data matching request carries a identifier of a first social network platform, a first user group in the first social network platform designated by users, and a identifier of a second social network platform and root node users in a second social network platform designated by the users;
obtaining a group behavior data corresponding to the first user group in the first social network platform corresponding to the identifier of the first social network platform, and performing behavior learning to the group behavior data to obtain a group feature distribution function corresponding to the first user group;

obtaining associated users of the root node users in the second social network platform, and obtaining the behavior data corresponding to the root node users and each of the associated users in the second social network platform;

learning the behavior data of the root node users based on the group feature distribution function corresponding to the first user group, and generating the group feature distribution function after matching the root node users;

performing the behavior learning to the behavior data of each associated user based on the group feature distribution function after matching the root node users, and generating the group feature distribution function after matching each of the associated users;

calculating a maximum entropy value of the group feature distribution function after matching the associated users, and determining the associated users corresponding to the largest maximum entropy value as the matching users of the first user group; and regarding the determined matching users as current root node users, determining a next matching user until the determined matching users meet a set quantity condition, and completing a group matching.

At least one non-transitory computer readable storage medium storing computer readable instructions that, when executed by at least one processors, cause the at least one processor to perform steps comprising:

receiving a data matching request sent by a terminal, wherein the data matching request carries a identifier of a first social network platform, a first user group in the first social network platform designated by users, and a identifier of a second social network platform and root node users in a second social network platform designated by the users;

obtaining a group behavior data corresponding to the first user group in the first social network platform corresponding to the identifier of the first social network platform, and performing behavior learning to the group behavior data to obtain a group feature distribution function corresponding to the first user group;

obtaining associated users of the root node users in the second social network platform, and obtaining the behavior data corresponding to the root node users and each of the associated users in the second social network platform;

learning the behavior data of the root node users based on the group feature distribution function corresponding to the first user group, and generating the group feature distribution function after matching the root node users;

performing the behavior learning to the behavior data of each associated user based on the group feature distribution function after matching the root node users, and generating the group feature distribution function after matching each of the associated users;

calculating a maximum entropy value of the group feature distribution function after matching the associated users, and determining the associated users corresponding to the largest maximum entropy value as the matching users of the first user group; and regarding the determined matching users as current root node users, determining a next matching user until the determined matching users meet a set quantity condition, and completing a group matching.

The details of one or more embodiments of the subject matter described in the present disclosure are set forth in the accompanying drawings and the description below. Other features and advantages of the present disclosure will become apparent from the description, the accompanying drawings, and the claims.

BRIEF DESCRIPTION OF THE DRAWINGS

To illustrate the technical solutions according to the embodiments of the present disclosure more clearly, the accompanying drawings for describing the embodiments are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the technical solutions and advantages of the present disclosure more clear, the present disclosure will be further described in detail below with reference to the accompanying drawings and embodiments. It is understood that the specific embodiments described herein are merely illustrative of the disclosure and are not intended to limit the present disclosure.

Figure 1:
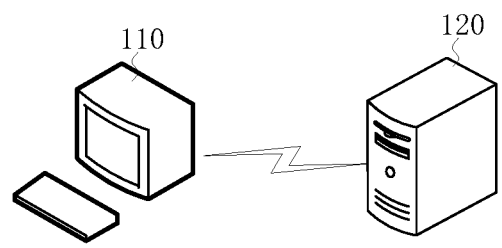
FIG. 1 is an application environment view of a method of matching cross-platform data according to an embodiment.

As shown in FIG. 1, in one embodiment, an application environment diagram of a method of matching cross-platform data is provided, which comprises a terminal 110 and a server 120. The terminal 110 can communicate with server 120 via a network. The terminal 110 may be at least one of a smartphone, a tablet, a laptop, and a desktop computer, but is not limited thereto. The server 120 may be an independent physical server or a server cluster composed of a plurality of physical servers. The server 120 pre-stores user data of a plurality of social network platforms including social relationship data among the users in platforms and various information published by the users in platforms. The terminal 110 performs a designation of a source social network platform (the first social network platform) and a matching target social network platform (the second social network platform), and the server 120 obtains a group behavior data corresponding to a first user group in the first social network platform based on the information sent by the terminal, and performs a behavior learning to a found group behavior data to obtain a group feature distribution function. Then, a root node user of the designated second social network platform is regarded as a finding start point, and considering the social network structure, matching nodes are determined one by one by the behavior data learning of each candidate node, i.e., a second user group matching with the first user group is found by a cross-platform way. In other words, an integration of cross-platform data is achieved, and an integrated big data is more conducive to perform an accurate analysis.

Figure 2:
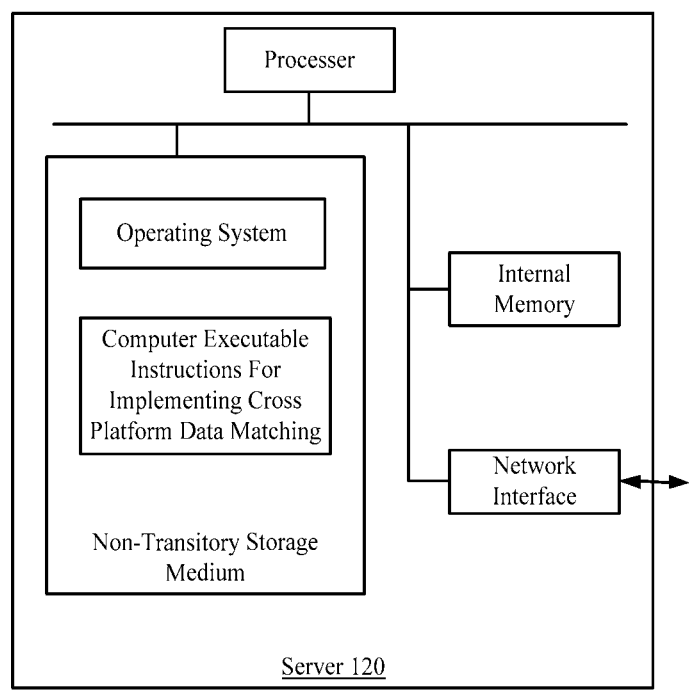
FIG. 2 is a schematic view of the internal structure of a server according to an embodiment.
Figure 3:
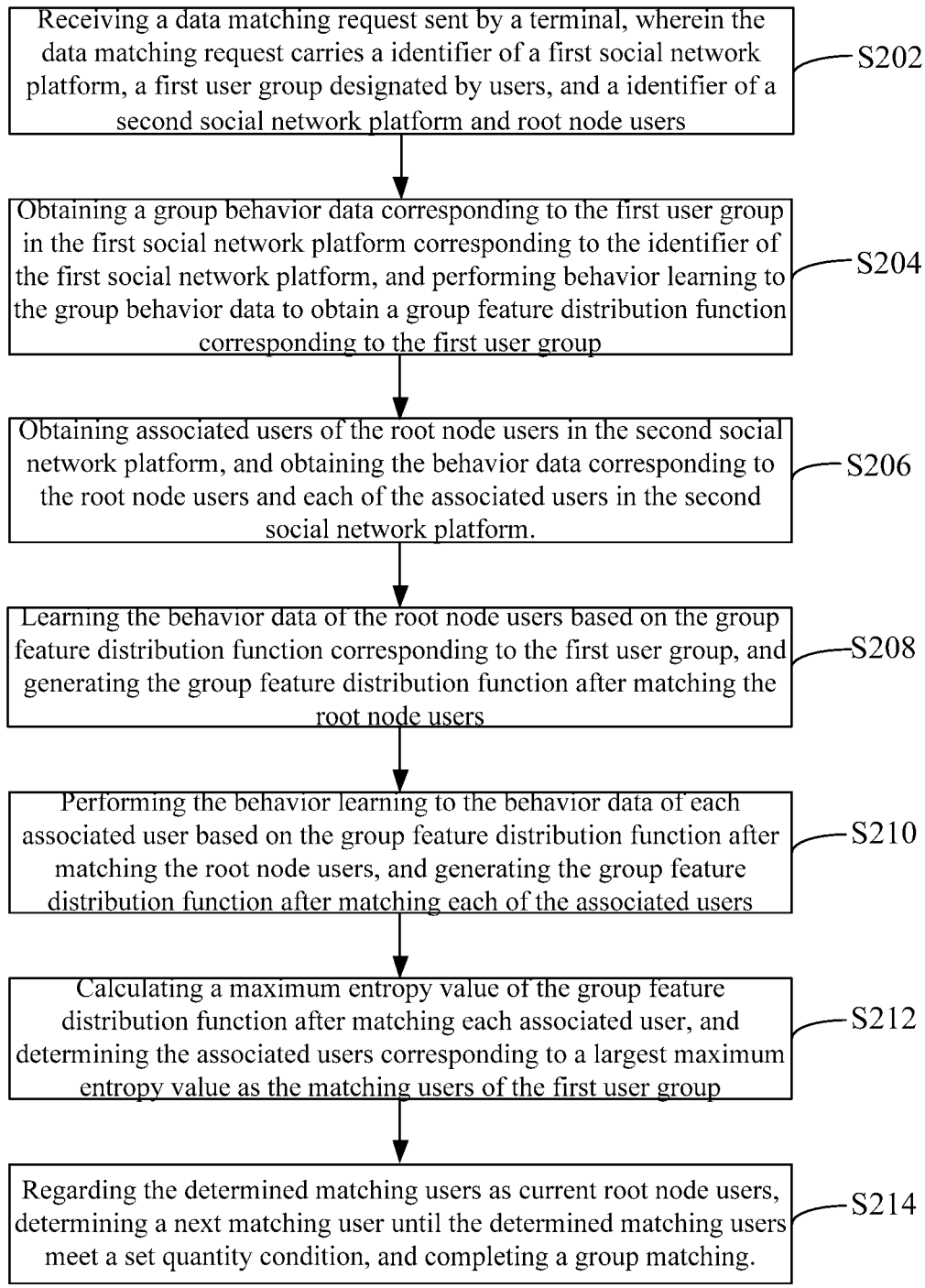
FIG. 3 is a flow chart of the method of matching cross-platform data according to an embodiment.

As shown in FIG. 2, in one embodiment, a server 120 is provided, which comprises a processor, a non-transitory storage medium, an internal memory, and a network interface, which are connected via a system bus. The non-transitory storage medium of the server 120 stores an operating system, a database, and at least one computer readable instruction. When the computer readable instructions are executed by the processor, the processor performs the method of matching cross-platform data as shown in FIG. 3. The processor is configured to provide computing and control capabilities for supporting the operation of the entire server 120. The internal memory provides an environment for the operation of the operating system and the computer readable instructions in the non-transitory storage medium. The network interface is configured to perform a communication connection with the terminal 110.

In one embodiment, the server 120 further comprises the database configured to store user behavior data extracted from the social network platforms. Persons skilled in the art can understand that the structure of the server shown in FIG. 2 is only a block diagram of a part of the structure related to the solution of the present disclosure, and does not constitute a limitation of the server on which the solution of the present disclosure is applied. The specific server may comprise more or fewer components than those shown in the figures, or combinations of some components, or have different component arrangements.

FIG. 3 is a schematic flow chart of a method according to an embodiment of the present disclosure. It should be understood that although the various steps in the flowchart of FIG. 3 are sequentially displayed as indicated by the arrows, these steps are not necessarily performed in the order indicated by the arrows. Unless explicitly stated herein, the performing order of the steps is not be limited strictly, and the steps may be performed in other orders. Moreover, at least part of the steps in FIG. 3 may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

As shown in FIG. 3, in an embodiment, a method of matching cross-platform data is provided, which specifically comprises the following steps:

In step S202: a data matching request sent by a terminal is received, the data matching request carries a identifier of a first social network platform, a first user group in the first social network platform designated by users, and a identifier of a second social network platform and root node users in a second social network platform designated by the users.

Identification information of a plurality of social network platforms and user identification information in each social network platform may be pre-stored in the terminal. The user identification information corresponding to each social network platform may also be stored in the server, and the terminal sends a request for obtaining the user identification information to the server by the social network platform identifier. The social network platform here may be a Foursquare platform, a Twitter platform, a Weibo platform, an MSN platform, etc.

Figure 4:
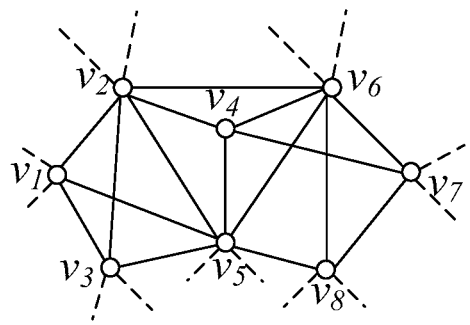
FIG. 4 is a social network diagram according to an embodiment.

In the present embodiment, the terminal designates a source social network platform and a target social network platform, and designates a first user group based on the source social network platform, and designates root node users based on the designated target social network platform. The method of the present embodiment is configured to implement a data matching between the source social network platform and the target network platform. The above source social network platform is the first social network platform, and the target social network platform is the second social network platform. The user identification information in the social network platform is presented in a terminal page in the form of a social network diagram as shown in FIG. 4 Terminal users can designate the first user group and the root node users by the means of clicking and selecting.

It should be noted that the first user group is a user group with a certain group coritivity, which indicates a minimum value of the number of other members in the group adjacent to each user node. For example, if the group coritivity required to be met by the first user group is 2, the number of other members in the group adjacent to each group in the group should be no less than two.

In one embodiment, the terminal may designate one or more user nodes, group scale, and group coritivity, and the terminal automatically finds a user group that meets the group scale, the coritivity condition, and comprises the designated user nodes according to the social network diagram. In another embodiment, the terminal may designate one or more user nodes, group scale, and the group degree of intimacy, and the terminal automatically finds a user group that meets the group number, the group degree of intimacy, and comprises the designated user node according to the social network diagram.

In step S204: a group behavior data corresponding to the first user group is obtained in the first social network platform corresponding to the identifier of the first social network platform, and the behavior learning to the group behavior data is performed to obtain a group feature distribution function corresponding to the first user group.

The server receives the source social network platform identifier and the designated first group user sent by the user terminal, where the source social network platform is the first social network platform. The server requests the source social network platform for the group behavior data corresponding to the first user group, wherein the group behavior data is the information published in the source social network platform by all users in the first user group and the attribute information corresponding to the users. The server can store the obtained group behavior data (i.e., the user behavior data). When next data matching is performed, firstly, it is found whether the corresponding behavior data is stored locally, and if yes, the required user behavior data is directly obtained from the local storage.

For example, the source social network platform is the Foursquare platform, and the group behavior data corresponding to the first user group is sign-in information, comment information, and the attribute information of the group members, such as birthday, educational background, aphorism, etc., which are published by the members of the first user group in the Foursquare platform.

Essentially, performing a behavior learning of group positioning data is a process of obtaining a behavior attribute distribution of the user group, that is, modeling the information and features of the user group to obtain a group feature distribution function.

In step S206: the associated users of the root node users are obtained in the second social network platform, and the behavior data corresponding to the root node users and each of the associated users are obtained in the second social network platform.

Specifically, when the terminal sends a data request, the request further carries the designated target social network platform identifier (corresponding to the second social network platform) and the root node user identifier, wherein the root node user identifier is the user identifier in the target social network platform.

The server obtains a social network diagram of the target social network platform (including nodes in the target social network platform and relationship data associated with nodes), and finds associated users having an association relationship with the designated root node user based on the obtained social network diagram.

In one embodiment, the associated users of the root node users may be the users directly associated with the root nodes. As shown in FIG. 4, if $v_1$ is a root node user, the associated users shown in the figure are $v_2$, $v_3$, and vs.

In step S208: the behavior data of the root node users are learned based on the group feature distribution function corresponding to the first user group and the group feature distribution function after matching the root node users is generated.

After determining the root node users in the target social network platform, based on that the group feature distribution function corresponding to the first user group has been learned, the server further performs the behavior data learning of the root node users to obtain the group feature distribution function corresponding to the new user group (including the first user group and the root node users) after matching the root node users.

It should be noted that, the root node user designated by the user is a user that can be accurately confirmed by the user and matches a certain user in the first user group. For example, the first user group comprises the user "Mary", who is substantially the same person as the root node user "Marysweety" designated by the user in the target social network platform, that is, the root node user is the determined first user matching with the first user group.

In step S210: the behavior learning to the behavior data of each associated user is performed based on the group feature distribution function after matching the root node users and the group feature distribution function after matching each of the associated users is generated.

In step S212: a maximum entropy value of the group feature distribution function after matching each associated user is calculated, and determining the associated users corresponding to a largest maximum entropy value as the matching users of the first user group.

The server determines a second matching user from the associated users having the association relationship with the root node users. Specifically, the learning to the behavior data of each associated user is performed based on the group feature distribution function after matching the root node users, that is, the behavior feature of each associated user is learned, and an original feature distribution function is corrected, and a new group feature distribution function is obtained. That is, after the feature learning, the group feature distribution function matching each associated user is obtained.

In order to determine the most probable matching users in these associated users, the maximum entropy of the model is calculated according to the group feature distribution function corresponding to each associated user. The larger the maximum entropy is solved, the better the model learned after the associated users matching with the first user group, and the higher the matching degree between the associated users and the first user group. Therefore, the associated users corresponding to the largest maximum entropy value are determined as the matching users of the first user group.

In step S214: the determined matching users is regarded as current root node users, a next matching user is determined until the determined matching users meet a set quantity condition, and a group matching is completed.

The determined associated users are regarded as the current root node users, and the associated users of the current root node users are obtained in the target social network platform, and then based on the group feature distribution function corresponding to the user group (including the first user group, the designated root node users, and the current root node users) after matching with the current root node users, the behavior data of the associated users of the current root node users are learned respectively, and the next matching user is determined according to the maximum entropy. The above steps are cycled, and the determination of the matching user is performed one by one until the determined matching users meet the set quantity condition, that is, the group matched with the designated group of the source social network platform is obtained in the target social network platform.

The first user group of the first social network platform and the matching user group of the second social network platform are groups of the same user group connected in different social networks. The data corresponding to the two groups can perform cross-platform integration and analysis, in other words, the cross-platform data integration is achieved, and the big data after integration is more conducive to accurate analysis.

In one embodiment, the designated associated users of the root node users are user nodes in the second social network platform which have a degree of intimacy with the root node users no less than a set threshold, wherein the set threshold is set according to the degree of intimacy of the first user group.

The associated users of the root node users of the second social network platform designated by the terminal are determined according to the social network relationship of the second social network platform. Specifically, the degree of intimacy of the root node users with neighboring user nodes thereof is calculated, wherein the larger the ratio of the number of nodes collectively adjacent to the two user nodes to the number of all nodes adjacent to the two user nodes, and the higher the degree of intimacy of the two nodes. The degree of intimacy of the user nodes can be calculated by the following formula:

$$\omega(u, v) = \frac{|N(u) \cap N(v)| + 1}{|N(u) \cup N(v)|}$$

wherein, N(u) indicates the set of adjacent nodes of node u, and the number of common adjacent nodes of nodes u and v is $|N(u) \cap N(v)|$. In the calculation of degree of intimacy, the numerator equals to the number of the common neighbors of the nodes plus 1, which is mainly to avoid a situation that there is an edge between the two nodes, but the degree of intimacy is zero.

In another embodiment, the measurement of the correlation of the two nodes in the figure can also be implemented by using the Random Walks with Restart (RWR) theory. Starting from the node $v_q$, based on the weight of the link at each step, RWR is performed by the link following to another node. In addition, the probability of having a return node $v_q$ in each step is as follows:

$$r^{(t+1)} = \tau S r^{(t)} + (1-\tau) q$$

The degree of intimacy of $v_q$ with other nodes is that an iteration is performed continually based on the above formula, until it reaches stability (the changing of the value r is very small for two iterations), and the ith bit in this vector is the degree of intimacy of $v_q$ with $v_i$.

The above-described degree of intimacy alignment threshold may be determined according to the degree of intimacy of the first user group in the source social network platform. Specifically, the degrees of intimacy in the users in the first user group are calculated, the minimum degree of intimacy value is determined and regarded as the degree of intimacy threshold for finding the associated users.

In one embodiment, the step of regarding the determined matching users as current root node users, determining a next matching user until the determined matching users meet a set quantity condition, and completing a group matching is: regarding the determined matching users as the current root node users, and finding current associated users of the current root node users in the second social network platform, wherein a degree of group intimacy consisting of the found current associated users and all of the determined matching users and the designated root nodes is no less than the set threshold; determining the next matching user in the current associated users until the determined matching users meet the set quantity condition, and completing the group matching.

When determining the associated users of the root node users designated by the terminal, the degree of intimacy of the neighboring users with the associated users is calculated. With the increasing of the determined matching user, when the next level associated users are determined, the degree of intimacy of the user nodes around the current root node users with the all of the determined matching users (including the designated root node users) should meet the set threshold.

For example, a root node user designated by the terminal is u, and a first level matching user $v_1$ is determined from the associated users of the root nodes (having the association relationship with user u and the degree of intimacy with the user u not less than the first set threshold); and then the user $v_1$ is regarded as the current root node user to determine the associated users of $v_1$. The associated user of $v_1$ should have the association relationship with the $v_1$, and the degree of group intimacy of the group consisting of the associated user of $v_1$, u, and $v_1$ is no less than the set second threshold value, wherein the degree of group intimacy is the sum of the degree of intimacy of the members with each other in the group (e.g. the degree of group intimacy of the group consisting of $w_1$, $w_2$, and $w_3$ is the sum of the degree of intimacy between $w_1$ and $w_2$, and the degree of intimacy between $w_2$ and $w_3$, and the degree of intimacy between $w_1$ and $w_3$). After determining the associated users of $v_1$, the behavior learning to associated users of $v_1$ is performed, and the next level matching users are determined form the associated users of $v_1$, and then the new determined matching users is regarded as the current root node users to further determine the next matching user until the number of the determined matching users meet the set quantity condition.

In one embodiment, the group match is completed when the number of the determined matching users (including the root node users designated by the terminal) equals to the number of members of the first user group. That is, a matching group having the same group scale as the first user group of the first social network platform is found in the second social network platform.

In another embodiment, the group scale of the matching group and the first user group may also be different. The matching end point is that when the associated users satisfying the condition cannot be found, or the maximum entropy of the group feature distribution function after the behavior learning cannot satisfy the set condition, i.e., when the matching effect is not good.

Figure 5:
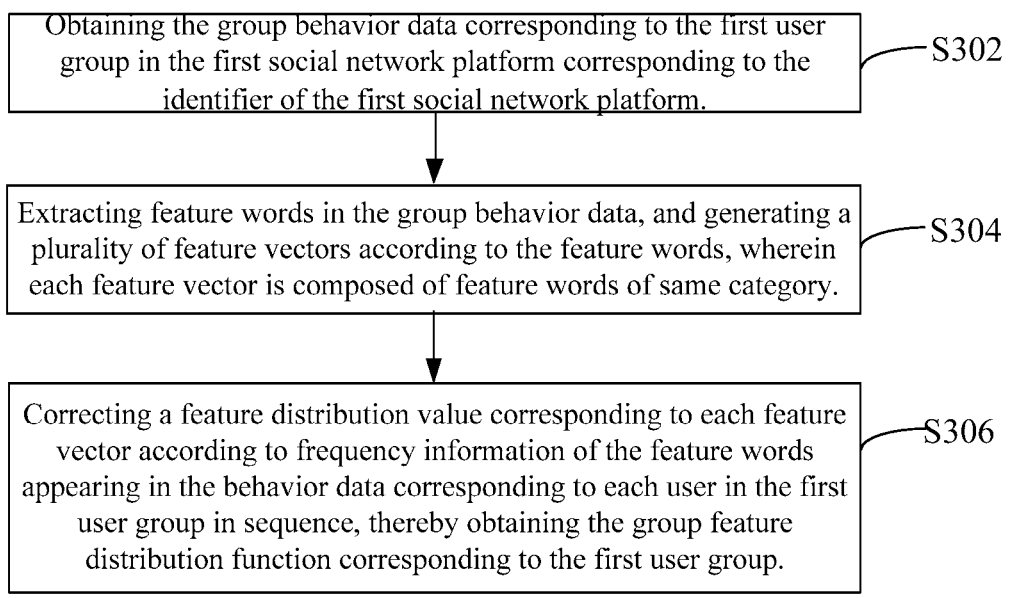
FIG. 5 is a flow chart involved in a group behavior feature learning in an embodiment.

In an embodiment, as shown in FIG. 5, in step S204: the step of obtaining a group behavior data corresponding to the first user group in the first social network platform corresponding to the identifier of the first social network platform, and performing behavior learning to the group behavior data to obtain a group feature distribution function corresponding to the first user group comprises:

In step S302: the group behavior data corresponding to the first user group is obtained in the first social network platform corresponding to the identifier of the first social network platform.

The group behavior data corresponding to the first user group is the information published in the first social network platform within a set time period by all users in the first user group and the attribute information corresponding to all users in the first user group.

For example, the group behavior data of the first user group is the information published within 24 months by all members in the first user group and the user details information filled by the members when registering the first social network platform.

In step S304: the feature words is extracted in the group behavior data, and a plurality of feature vectors is generated according to the feature words, wherein each feature vector is composed of feature words of same category.

Specifically, the feature words extracted from the group behavior data are all meaningful words or phrases. Each generated feature vector comprises a plurality of feature words of same category.

Supposing the user set X is {Mary, John, Lily, Tom, . . . } (marked as {$x_1$, $x_2$, $x_3$, $x_4$ . . . }), the feature words is extracted from the behavior data of Mary, John, Lily, Tom . . . . In the user set, and the state space corresponding to the user set is [apple, London, Messi, football, rain, fruit, New York, swimming, running Ronaldo, Manchester . . . ]. Then a feature vector $f_1$ is generated according to the feature words in the state space, for example, $f_2$ is [football, Messi, Ronaldo, Manchester . . . ], $f_2$ is [London, New York . . . ], $f_3$ is [apple, fruit . . . ], $f_4$ is [swimming, running . . . ] and so on. There is no limit to the number of the generated feature vectors, and according set classification rules, the extracted feature vector can be assigned to various types, so as to generate a plurality of feature vectors.

In step S306: a feature distribution value corresponding to each feature vector is corrected according to frequency information of the feature words appearing in the behavior data corresponding to each user in the first user group in sequence, thereby the group feature distribution function corresponding to the first user group is obtained.

The behavior data of each user in the first user group is learned sequentially, and the frequency of the extracted feature words appeared in the learned user behavior data is obtained, so as to calculate the behavior feature distribution value generated by the user behavior data for each feature vector. The behavior data of the next user is learned, and the feature distribution value corresponding to each feature vector is corrected, thereby obtaining a group feature distribution function corresponding to the first user group.

For example, the behavior data of Mary is learned, and the behavior feature distribution value of Mary corresponding to the feature vector $f_1$ is obtained. Specifically, it is found whether the feature words in the feature vector $f_1$ appears in the behavior data of Mary, and if so, the frequency of occurrence of each feature word in the $f_1$ is counted, and the sum of the frequency of occurrence of each feature word in the $f_1$ is the behavior feature distribution value of Mary corresponding to $f_1$. Similarly, the behavior feature distribution value of Mary corresponding to other feature vectors is calculated, thereby all of the behavior feature distribution of Mary ($x_1$) is obtained.

The behavior data of other users in the group is learned in the same way, thereby the group feature distribution function corresponding to the first user group is obtained.

In one embodiment, the group feature distribution function is represented by the following formula:

$$p_A(y \mid x) = \frac{1}{Z(x)} \exp\left(\sum_{j=1}^{F} f_j(x, y)\lambda_{j,y}\right)$$

wherein, x represents a user, and y represents a user's tag (i.e., a set of feature words extracted according to user behavior data), and f represents a feature (a feature vector) of the user, $\lambda$ represents the weight of the corresponding feature.

In one embodiment, in step S208: the step of learning the behavior data of the root node users based on the group feature distribution function corresponding to the first user group, and generating the group feature distribution function after matching the root node users is: regarding the feature vector extracted according to the group behavior data corresponding to the first user group as a basis of behavior learning, and learning the behavior data of the root node users to correct the feature distribution value corresponding to each feature vector, and generating the group feature distribution function after matching the root node users.

based on learning the feature vector corresponding to the first user group, the behavior features of the users in the second social network platform are learned, and the group behavior distribution function after adding new users is obtained, the behavior features of the users can be determined whether they conform the group behavior features of the first user group by comparing the distribution function (by the standard of the maximum entropy), and if yes, the user can be determined as the matching user.

When the matching learning is performed, the feature vectors are not added, but the users in the second social network platform are verified by the standard of the feature vectors of the first user group. After the behavior learning, the user can be accurately determined whether the user is the matching user of the first user group.

Figure 6:
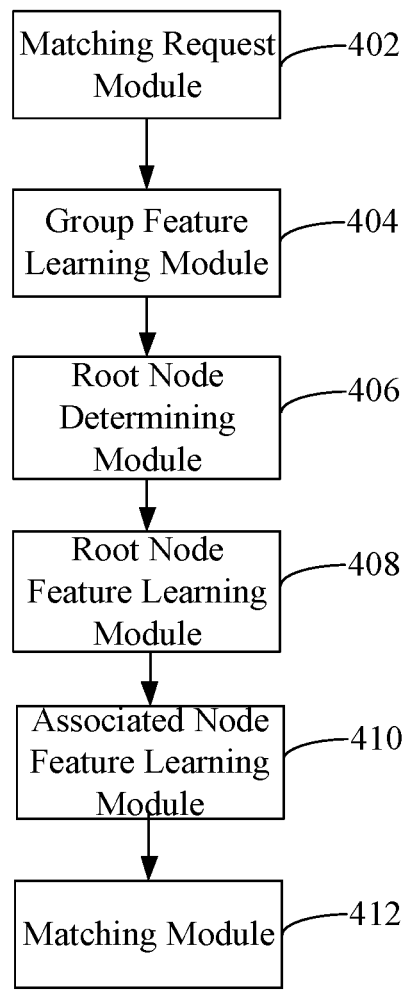
FIG. 6 is a block diagram of a cross-platform data matching device according to an embodiment.

In an embodiment, as shown in FIG. 6, a cross-platform data matching device is provided, which comprises: a matching request module 402 configured to receive a data matching request sent by a terminal, wherein the data matching request carries a identifier of a first social network platform, a first user group in the first social network platform designated by users, and a identifier of a second social network platform and root node users in a second social network platform designated by the users;

a group feature learning module 404 configured to obtain a group behavior data corresponding to the first user group in the first social network platform corresponding to the identifier of the first social network platform, and performing behavior learning to the group behavior data to obtain a group feature distribution function corresponding to the first user group;

a root node determining module 406 configured to obtain associated users of the root node users in the second social network platform, and to obtain the behavior data corresponding to the root node users and each of the associated users in the second social network platform;

a root node feature learning module 408 configured to learn the behavior data according to the root node users based on the group feature distribution function corresponding to the first user group and generate the group feature distribution function after matching the root node users;

an associated node feature learning module 410 configured to perform the behavior learning to the behavior data of each associated user based on the group feature distribution function after matching the root node users, and generating the group feature distribution function after matching each of the associated users; and a matching module 412 configured to calculate a maximum entropy value of the group feature distribution function after matching the associated users, and determining the associated users corresponding to the largest maximum entropy value as the matching users of the first user group, and to use the determined matching users as current root node users for determining a next matching user, until the determined matching users meet a set quantity condition, and to complete a group matching.

In one embodiment, the designated associated users of the root node users are user nodes in the second social network platform which have a degree of intimacy with the root node users no less than a set threshold, wherein the set threshold is set according to the degree of intimacy of the first user group.

In an embodiment, the matching module 412 is further configured to regard the determined matching users as the current root node users, and finding current associated users of the current root node users in the second social network platform, wherein a degree of group intimacy consisting of the found current associated users and all of the determined matching users and the designated root nodes is no less than the set threshold; the next matching user is determined in the current associated users until the determined matching users meet the set quantity condition, and the group matching is completed.

Figure 7:
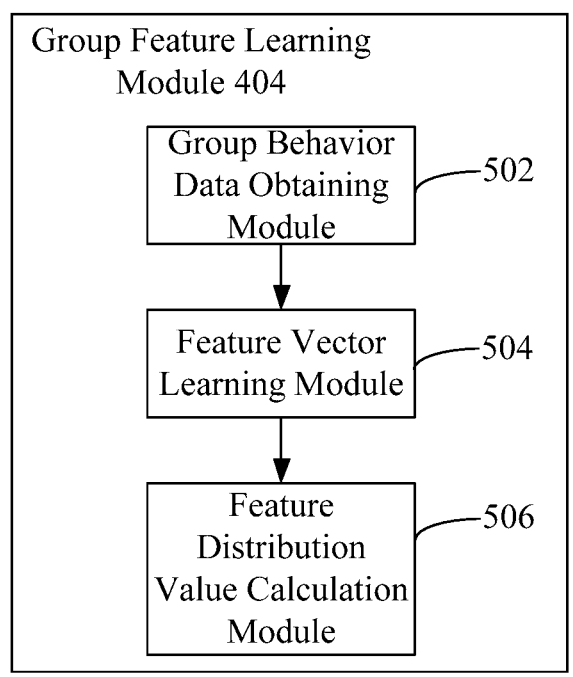
FIG. 7 is a block diagram of the group feature learning module according to an embodiment.

In an embodiment, as shown in FIG. 7, the group feature learning module 404 comprises:

a group behavior data obtaining module 502 configured to obtain the group behavior data corresponding to the first user group in the first social network platform corresponding to the identifier of the first social network platform;

a feature vector learning module 504 configured to extract feature words in the group behavior data, and generating a plurality of feature vectors according to the feature words, wherein each feature vector is composed of feature words of same category; and a feature distribution value calculation module 506 configured to correct a feature distribution value corresponding to each feature vector according to frequency information of the feature words appearing in the behavior data corresponding to each user in the first user group in sequence, thereby obtaining the group feature distribution function corresponding to the first user group.

In an embodiment, the root node feature learning module 408 is further configured to regard the feature vector extracted according to the group behavior data corresponding to the first user group as a basis of behavior learning, and learn the behavior data of the root node users to correct the feature distribution value corresponding to each feature vector and generate the group feature distribution function after matching the root node users.

In an embodiment, a computer apparatus is provided, which comprises a processor and a memory storing computer readable instructions, which, when executed by the processor, cause the processor to perform steps comprising: receiving a data matching request sent by a terminal, wherein the data matching request carries a identifier of a first social network platform, a first user group in the first social network platform designated by users, and a identifier of a second social network platform and root node users in a second social network platform designated by the users; obtaining a group behavior data corresponding to the first user group in the first social network platform corresponding to the identifier of the first social network platform, and performing behavior learning to the group behavior data to obtain a group feature distribution function corresponding to the first user group, and obtaining the behavior data according to the root node users and the associated users in the second social network platform; learning the behavior data according to the root node users based on the group feature distribution function corresponding to the first user group, and generating the group feature distribution function after matching the root node users; performing the behavior learning to the behavior data of each associated user based on the group feature distribution function after matching the root node users, and generating the group feature distribution function after matching each of the associated users; calculating a maximum entropy value of each group feature distribution function after matching, and determining the associated users corresponding to the largest maximum entropy value as the matching users of the first user group; and regarding the determined matching users as current root node users, determining a next matching user until the determined matching users meet a set quantity condition, and completing a group matching.

In one embodiment, the designated associated users of the root node users are user nodes in the second social network platform which have a degree of intimacy with the root node users no less than a set threshold, wherein the set threshold is set according to the degree of intimacy of the first user group.

In an embodiment, the step of regarding the determined the matching users as the current root node users for determining the next matching user, until the determined matching users meet the set quantity condition, and completing the group matching, which is executed by the processer of the computer apparatus, is: regarding the determined matching users as the current root node users, and finding current associated users of the current root node users in the second social network platform, wherein a degree of group intimacy consisting of the found current associated users and all of the determined matching users and the designated root nodes is no less than the set threshold; and determining the next matching user in the current associated users until the determined matching users meet the set quantity condition, and completing the group matching.

In an embodiment, the step of obtaining a group behavior data corresponding to the first user group in the first social network platform corresponding to the identifier of the first social network platform, and performing behavior learning to the group behavior data to obtain a group feature distribution function corresponding to the first user group, which is executed by the processer of the computer apparatus, is: obtaining the group behavior data corresponding to the first user group in the first social network platform corresponding to the identifier of the first social network platform; extracting feature words in the group behavior data, and generating a plurality of feature vectors according to the feature words, wherein each feature vector is composed of feature words of same category; And correcting a feature distribution value corresponding to each feature vector according to frequency information of the feature words appearing in the behavior data corresponding to each user in the first user group in sequence, thereby obtaining the group feature distribution function corresponding to the first user group.

In an embodiment, the step of learning the behavior data according to the root node users based on the group feature distribution function corresponding to the first user group, and generating the group feature distribution function after matching the root node users, which is executed by the processer of the computer apparatus, is: regarding the feature vector extracted according to the group behavior data corresponding to the first user group as a basis of behavior learning, and learning the behavior data of the root node users to correct the feature distribution value corresponding to each feature vector, and generating the group feature distribution function after matching the root node users;

In an embodiment, it is provided one or more non-transitory computer readable storage medium storing computer readable instructions, which, when executed by at least one processors, cause the one or more processor to perform steps comprising: receiving a data matching request sent by a terminal, wherein the data matching request carries a identifier of a first social network platform, a first user group in the first social network platform designated by users, and a identifier of a second social network platform and root node users in a second social network platform designated by the users; obtaining a group behavior data corresponding to the first user group in the first social network platform corresponding to the identifier of the first social network platform, and performing behavior learning to the group behavior data to obtain a group feature distribution function corresponding to the first user group; obtaining associated users of the root node users in the second social network platform, and obtaining the behavior data corresponding to the root node users and each of the associated users in the second social network platform; learning the behavior data according to the root node users based on the group feature distribution function corresponding to the first user group, and generating the group feature distribution function after matching the root node users; performing the behavior learning to the behavior data of each associated user based on the group feature distribution function after matching the root node users, and generating the group feature distribution function after matching each of the associated users; calculating a maximum entropy value of each group feature distribution function after matching, and determining the associated users corresponding to the largest maximum entropy value as the matching users of the first user group; and regarding the determined matching users as current root node users, determining a next matching user until the determined matching users meet a set quantity condition, and completing a group matching.

In one embodiment, the designated associated users of the root node users are user nodes in the second social network platform which have a degree of intimacy with the root node users no less than a set threshold, wherein the set threshold is set according to the degree of intimacy of the first user group.

In an embodiment, the step of regarding the determined the matching users as the current root node users for determining the next matching user, until the determined matching users meet the set quantity condition, and completing the group matching, which is executed by the processer, is: regarding the determined matching users as the current root node users, and finding current associated users of the current root node users in the second social network platform, wherein a degree of group intimacy consisting of the found current associated users and all of the determined matching users and the designated root nodes is no less than the set threshold; and determining the next matching user in the current associated users until the determined matching users meet the set quantity condition, and completing the group matching.

In an embodiment, the step of obtaining a group behavior data corresponding to the first user group in the first social network platform corresponding to the identifier of the first social network platform, and performing behavior learning to the group behavior data to obtain a group feature distribution function corresponding to the first user group, which is executed by the processor, is: obtaining the group behavior data corresponding to the first user group in the first social network platform corresponding to the identifier of the first social network platform; extracting feature words in the group behavior data, and generating a plurality of feature vectors according to the feature words, wherein each feature vector is composed of feature words of same category; And correcting a feature distribution value corresponding to each feature vector according to frequency information of the feature words appearing in the behavior data corresponding to each user in the first user group in sequence, thereby obtaining the group feature distribution function corresponding to the first user group.

In an embodiment, the step of learning the behavior data according to the root node users based on the group feature distribution function corresponding to the first user group, and generating the group feature distribution function after matching the root node users, which is executed by the processor, is: regarding the feature vector extracted according to the group behavior data corresponding to the first user group as a basis of behavior learning, and learning the behavior data of the root node users to correct the feature distribution value corresponding to each feature vector, and generating the group feature distribution function after matching the root node users;

Persons skilled in the art should understand that the processes of the methods in the above embodiments can be, in full or in part, implemented by computer-readable instructions instructing underlying hardware. The program can be stored in a computer-readable storage medium, and the program can include the processes in the embodiments of the abovementioned various methods when it is being executed. The aforementioned storage medium may be a non-transitory storage medium such as a magnetic disk, an optical disk, or a read-only memory (ROM), etc.

The technical features of the above-described embodiments may be combined arbitrarily. To simplify the description, all the possible combinations of the technical features in the above embodiments are not described. However, all of the combinations of these technical features should be considered as within the scope of the disclosure, as long as such combinations do not contradict with each other.

The above-described embodiments merely represent several embodiments of the present disclosure, and the description thereof is more specific and detailed, but it should not be construed as limiting the scope of the present disclosure.

It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of matching cross-platform data, comprising:
   receiving a data matching request sent by a terminal operated by a user, wherein the data matching request carries an identifier of a first social network platform, a first user group in the first social network platform designated by the terminal, an identifier of a second social network platform and root node users in the second social network platform designated by the terminal;
   obtaining a group behavior data corresponding to the first user group in the first social network platform corresponding to the identifier of the first social network platform, and performing behavior learning to the group behavior data to obtain a first group feature distribution function corresponding to the first user group;
   obtaining associated users of the root node users in the second social network platform, and obtaining behavior data corresponding to the root node users and each of the associated users in the second social network platform;
   learning the behavior data of the root node users based on the A group feature distribution function, and generating a second group feature distribution function after matching the root node users, wherein the second Troup feature distribution function corresponds to a new user group, the new user group including the first user group and the root node users;
   performing behavior learning to the behavior data of each associated user based on the second group feature distribution function, and generating a third group feature distribution function after matching each of the associated users;
   calculating a maximum entropy value of the third group feature distribution function, and determining the associated users corresponding to a largest maximum entropy value as being matching users of the first user group; and
   determining a next matching user until the determined matching users meet a set quantity condition by using the determined matching users as current root node users, and competing a group matching.

2. The method of claim 1, wherein the associated users of the root node users are user nodes in the second social network platform which have a degree of intimacy with the root node users no less than a set threshold, wherein the set threshold is set according to a degree of intimacy of the first user group.

3. The method of claim 2, wherein regarding the determined the matching users as the current root node users, determining the next matching user until the determined matching users meet the set quantity condition, and competing the group matching comprises:
   finding current associated users of the current root node users in the second social network platform by using the determined matching users as the current root node users, wherein a degree of intimacy of a group consisting of the found current associated users, all of the determined matching users, and the designated root nodes, is no less than the set threshold; and determining the next matching user in the current associated users until the determined matching users meet the set quantity condition, and completing the group matching.

4. The method of claim 1, wherein obtaining the group behavior data corresponding to the first user group in the first social network platform corresponding to the identifier of the first social network platform, and performing behavior learning to the group behavior data to obtain the group feature distribution function corresponding to the first user group, comprise:
obtaining the group behavior data corresponding to the first user group in the first social network platform corresponding to the identifier of the first social network platform;
extracting feature words in the group behavior data and generating a plurality of feature vectors according to the feature words, wherein the feature vectors are composed of feature words of a same category; and
obtaining the first group feature distribution function corresponding to the first group by correcting a feature distribution vale corresponding to each feature vector according to frequency information of the feature words appearing in behavior data corresponding to each user in the first user group in sequence.

5. The method of claim 4, wherein learning the behavior data of the root node users based on the first group feature distribution function corresponding to the first user group, and generating the second group feature distribution function after matching the root node users comprises:
correcting the feature distribution value corresponding to each feature vector by learning the behavior data of the root node users, wherein the learning the behavior of the root node users is based on the feature vector extracted according to the group behavior data corresponding to the first user group; and
generating the second group feature distribution function after matching the root node users.

6. A computer apparatus, comprising a processor and a memory storing computer readable instructions, which, when executed by the processor, cause the processor to perform steps comprising:
receiving a data matching request sent by a terminal operated by a user, wherein the data matching request carries an identifier of a first social network platform, a first user group in the first social network platform designated by the terminal, and an identifier of a second social network platform and root node users in the second social network platform designated by the terminal;
obtaining a group behavior data corresponding to the first user group in the first social network platform corresponding to the identifier of the first social network platform, and performing behavior learning to the group behavior data to obtain a first group feature distribution function corresponding to the first user group;
obtaining associated users of the root node users in the second social network platform, and obtaining behavior data corresponding to the root node users and each of the associated users in the second social network platform;
learning the behavior data of the root node users based on the first group feature distribution function, and generating a second group feature distribution function after matching the root node users, wherein the second group feature distribution function corresponds to a new user group, the new user group including the first user group and the root node users;
performing behavior learning to the behavior data of each associated user based on the second group feature distribution function, and generating a third group feature distribution function after matching each of the associated users;
calculating a maximum entropy value of the third group feature distribution function, and determining the associated users corresponding to a largest maximum entropy value as being matching users of the first user group; and
determining a next matching user until the determined matching users meet a set quantity condition by using the determined matching users as current root node users, and completing a group matching.

7. The computer apparatus of claim 6, wherein the associated users of the root node users are user nodes in the second social network platform which have a degree of intimacy with the root node users no less than a set threshold, wherein the set threshold is set according to a degree of intimacy of the first user group.

8. The computer apparatus according to claim 7, wherein the processor is further configured to perform:
finding current associated users of the current root node users in the second social network platform by using the determined matching users as the current root node users, wherein a degree of intimacy of a group consisting of the found current associated users, all of the determined matching users, and the designated root nodes, is no less than the set threshold; and
determining the next matching user in the current associated users until the determined matching users meet the set quantity condition, and completing the group matching.

9. The computer apparatus of claim 6, wherein the processor is further configured to perform:
obtaining the group behavior data corresponding to the first user group in the first social network platform corresponding to the identifier of the first social network platform;
extracting feature words in the group behavior data and generating a plurality of feature vectors according to the feature words, wherein the feature vectors are composed of feature words of a same category; and
obtaining the first group feature distribution function corresponding to the first group by correcting a feature distribution value corresponding to each feature vector according to frequency information of the feature words appearing in behavior data corresponding to each user in the first user group in sequence.

10. The computer apparatus of claim 9, wherein the processor is further configured to perform:
correcting the feature distribution value corresponding to each feature vector by learning the behavior data of the root node users, wherein the learning the behavior of the root node users is based on the feature vector extracted according to the group behavior data corresponding to the first user group; and
generating the se group feature distribution function after matching the root node users.

11. At last one non-transitory computer readable storage medium storing computer readable instructions, which, when executed by at least one processor, cause the at least one processor to perform steps comprising:
receiving a data matching request sent by a terminal operated by a user, wherein the data matching request carries an identifier of a first social network platform, a first user group in the first social network platform designated by the terminal, and an identifier of a second social network platform and root node users in the second social network platform designated by the terminal;

obtaining a group behavior data corresponding to the first user group in the first social network platform corresponding to the identifier of the first social network platform, and performing behavior learning to the group behavior data to obtain a group feature distribution function corresponding to the first user group;

obtaining associated users of the root node users in the second social network platform, and obtaining behavior data corresponding to the root node users and each of the associated users in the second social network platform;

learning the behavior data of the root node users based on the first group feature distribution function, and generating a second group feature distribution function after matching the root node users, wherein the second group feature distribution function corresponds to a new user group, the new user group including the first user group and the root node users;

performing behavior learning to the behavior data of each associated user based on the second group feature distribution function, and generating a third group feature distribution function after matching each of the associated users;

calculating a maximum entropy value of the third group feature distribution function, and determining the associated users corresponding to a largest maximum entropy value as being matching users of the first user group; and determining a next matching user until the determined matching users meet a set quantity condition by using the determined matching users as current root node users, and competing a group matching.

12. The storage medium of claim 11, wherein the associated users of the root node users are user nodes in the second social network platform which have a degree of intimacy with the root node users no less than a set threshold, wherein the set threshold is set according to a degree of intimacy of the first user group.

13. The storage medium of claim 12, wherein the processor is further configured to perform:

finding current associated users of the current root node users in the second social network platform by using the determined matching users as the current root node users, wherein a degree of intimacy of a group consisting of the found current associated users, all of the determined matching users, and the designated root nodes, is no less than the set threshold; and determining the next matching user in the current associated users until the determined matching users meet the set quantity condition, and completing the group matching.

14. The storage medium of claim 11, wherein the processor is further configured to perform:

obtaining the group behavior data corresponding to the first user group in the first social network platform corresponding to the identifier of the first social network platform;

extracting feature words in the group behavior data and generating a plurality of feature vectors according to the feature words, wherein the feature vectors are composed of feature words of a same category; and obtaining the first group feature distribution function corresponding to the first group by correcting a feature distribution vale corresponding to each feature vector according to frequency information of the feature words appearing in behavior data corresponding to each user in the first user group in sequences.

15. The storage medium of claim 14, wherein the processor is further configured to perform:

correcting the feature distribution value corresponding to each feature vector by learning the behavior data of the root node users, wherein the learning the behavior of the root node users is based on the feature vector extracted according to the group behavior data corresponding to the first user group; and generating the s group feature distribution function after matching the root node users.

* * * * *